(12) United States Patent
Flocchini

(10) Patent No.: US 12,178,349 B2
(45) Date of Patent: Dec. 31, 2024

(54) COFFEE FILTER DISPENSER

(71) Applicant: Andrew Flocchini, Petaluma, CA (US)

(72) Inventor: Andrew Flocchini, Petaluma, CA (US)

( * ) Notice: Subject to any disclaimer, the term of this patent is extended or adjusted under 35 U.S.C. 154(b) by 353 days.

(21) Appl. No.: 17/807,958

(22) Filed: Jun. 21, 2022

(65) Prior Publication Data

US 2022/0408961 A1 Dec. 29, 2022

Related U.S. Application Data

(60) Provisional application No. 63/202,909, filed on Jun. 29, 2021.

(51) Int. Cl.
*A47J 31/08* (2006.01)

(52) U.S. Cl.
CPC ..................... *A47J 31/08* (2013.01)

(58) Field of Classification Search
CPC .................................................. A47J 31/08
See application file for complete search history.

(56) References Cited

U.S. PATENT DOCUMENTS

| | | | | |
|---|---|---|---|---|
| 4,796,779 A | * | 1/1989 | Mamolou | B65H 1/04 221/36 |
| 5,097,984 A | * | 3/1992 | Meisner | A47J 31/08 221/45 |
| 5,388,724 A | * | 2/1995 | Adams | A47J 31/08 221/277 |
| 6,116,459 A | * | 9/2000 | Wilson | A47J 31/08 221/36 |
| 6,250,490 B1 | * | 6/2001 | Loftus | B65D 21/02 220/23.6 |

* cited by examiner

*Primary Examiner* — Gene O Crawford
*Assistant Examiner* — Ayodeji T Ojofeitimi
(74) *Attorney, Agent, or Firm* — Andrew F. Young; Nolte Lackenbach Siegel

(57) ABSTRACT

A coffee container and coffee filter dispenser combination that includes a base coffee container having a hollow interior volume and configured for placement on a flat surface, said coffee container having a hinged lid, a coffee filter container disposed atop said coffee container, wherein said hinged lid is a bottom side of said coffee filter container, said coffee filter container having a hinged lid, and a dispensing mechanism slidably and rotatably disposed in said lid of said coffee filter container, said dispensing configured to engage and separate individual coffee filters from a stack of filters contained in said coffee filter container.

14 Claims, 6 Drawing Sheets

COFFEE FILTER DISPENSER

CROSS REFERENCES TO RELATED APPLICATIONS

The present application claims the benefit of the filing date of U.S. Provisional Patent Application Ser. No. 63/202,909, filed Jun. 29, 2021 (Jun. 29, 2021), which application is incorporated in its entirety by reference herein.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

SEQUENCE LISTING

Not applicable.

BACKGROUND OF THE INVENTION

Field of the Invention: The present invention relates most generally to paper product dispensers, and more particularly to a coffee filter dispenser, and still more particularly to a coffee filter dispenser that engages a single filter in a stack of coffee filters to separate that single filter from the stack for easy grasping.

Background Discussion: Paper coffee filters for flat-bottom basket drip systems are made of tightly woven bleached or unbleached paper. They are typically quite fibrous. Also, they are typically sold in compressed and compacted stacks comprising many layers (sometimes several hundreds) of filters, each filter, other than the uppermost and lowermost, engaging neighboring filters above and below. The friction between layers is profound. Indeed, it is the epitome of understatement to describe them as difficult to separate by hand, inducing users to consider finger cots to make the task something less than vexing. Yet, separating the filters is essential, as brewing coffee in multiple filters both increases the time to complete the brewing and risks having water overflow the top of the basket, as it cannot drip through the filters quickly enough.

Thus, the task of separating the paper filters presents something of a challenge to accomplish without significant manual contact, as it often involves picking up the stack and attempting to slide the selected (outer) filter across the immediately neighboring filter so as to break the surface-to-surface bond between them. Even when donning latex gloves, this is difficult to do hygienically, and hygiene is critically important in commercial environments where care in handling articles used in food and beverage production is a matter of public health. Covid-19 has promoted that issue to the forefront of public awareness. Now, it is imperative that food service workers minimize directly handling articles such as coffee filters.

Further, in some environments with high humidity and large concentrations of airborne food particles, it is also imperative to limit exposure of coffee filters before use, inasmuch as they are absorbent and readily capture airborne food particles, smoke, dust, and exhaled respiratory particles from workers.

There is therefore a need for a closed and filter container that safely stores stacked basket filters and prevents exposure of the filter to ambient contaminants until use. There is a further need for such a container to enable a user to easily separate and remove a single filter from the filter stack with minimal manual contact with both the single filter and the stack, and to do so without the need for hyper dexterity and rubber fingers.

It is therefore a principal object of the present invention to provide a device for storing stacks of paper coffee filters in a closed container, removed and protected from exposure to airborne contaminants.

Along those same lines, it is an object of the present invention to provide a filter dispenser which contains a large number of filters and which can be loaded with filter stacks with minimal manual contact.

Yet another object of the present invention is to provide a coffee filter dispenser that quickly and easily separates a single filter from the filter stack and presents it to a user for easy grasping and placement in a filter basket.

BRIEF SUMMARY OF THE INVENTION

The present invention is a paper coffee filter container and dispenser for flat bottom basket filters that includes both a container portion and apparatus for engaging and separating a single filter from a stack of filters. The container and dispenser are collocated atop a coffee grounds container, thereby eliminating any need for counterspace additional to that taken by the coffee grounds container itself.

In embodiments the inventive coffee filter dispenser may be provided independently of a coffee container. In this most essential aspect, the filter dispenser includes a coffee filter container defining an interior volume configured to contain a stack of paper basket filters. The container has a transparent hinged lid and a dispensing mechanism slidably and rotatably disposed in the hinged lid. The dispenser is configured for manual manipulation to engage and separate individual coffee filters from a stack of filters contained in said coffee filter container.

In embodiments, the essential filter dispenser is coupled with a base coffee container having a hollow interior volume and configured for placement on a flat surface. The coffee container has a hinged lid that functions as both a lid for the coffee container and a flat base or bottom for the above-described filter dispenser.

In embodiments, the coffee filter container has an inverted truncated conical shape with an open top and a generally planar bottom side, a continuous angled side defining a hollow interior volume for containing a stack of paper coffee filters with scalloped sides, and a plurality of spaced-apart vertically-oriented stand-offs projecting inwardly from the angled side and configured to insert into trough portions of the scalloped sides of the paper coffee filters. The container has a transparent planar lid configured to be disposed atop the filter container and includes a hinge to provide selective access to the interior volume of the filter container. The lid includes a slot radially extending from a point near the center of the lid toward the edge of the lid. A dispensing mechanism is slidingly and rotatably disposed in the slot and includes a knob for gripping, a cylindrical rod disposed in the slot, and a dispensing wheel. These three elements are unified, such that a user may grasp the knob, slide the dispensing mechanism toward the innermost filter in a stack of filters, and turn the knob so as to dislodge and separate a portion of the filter from the other filters in the stack.

BRIEF DESCRIPTION OF SEVERAL VIEWS OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1A:
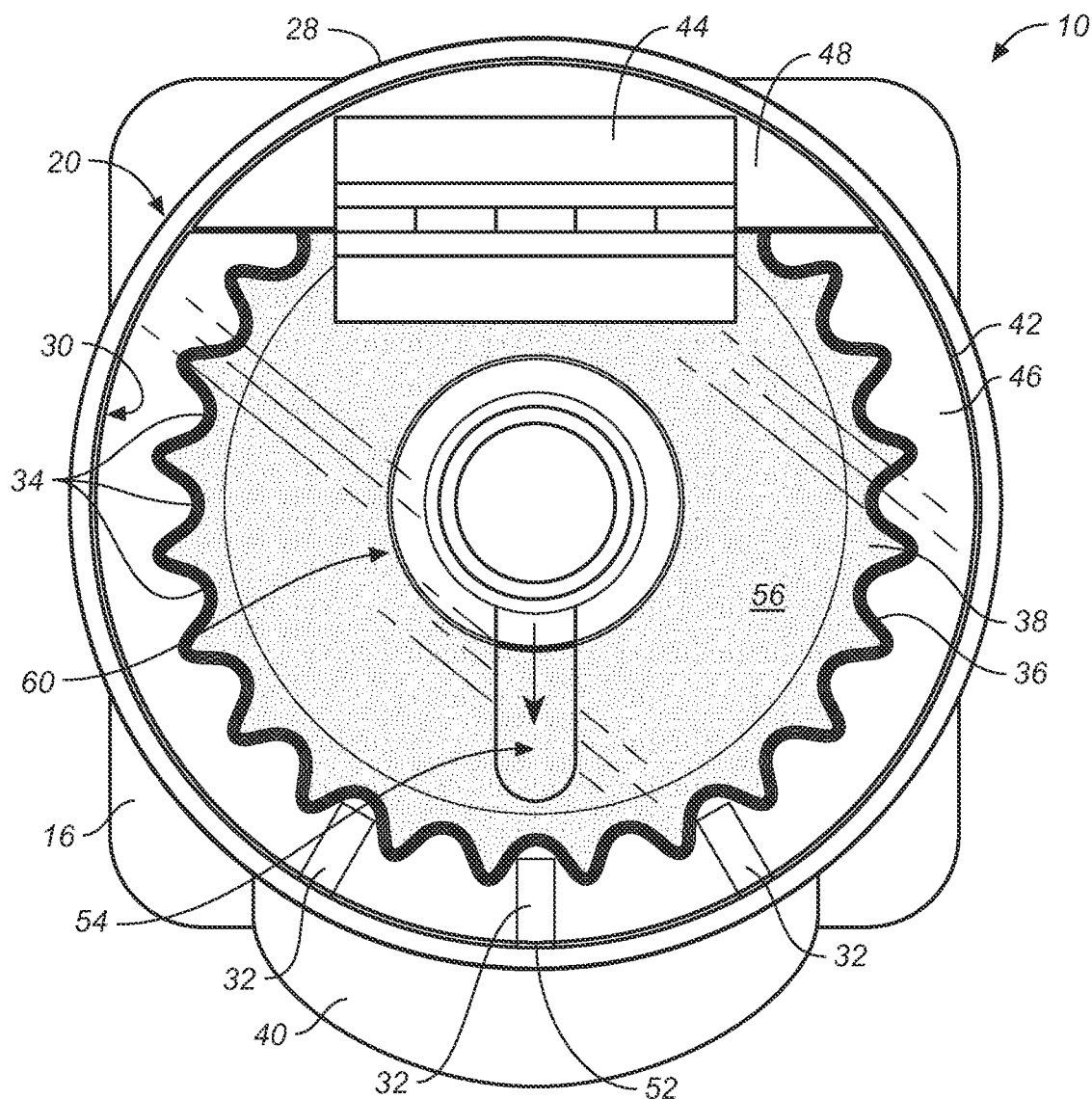
FIG. 1A is a top plan view of the coffee filter dispenser of the present invention, shown here with a transparent top such that the filter stack can be viewed inside the storage compartment, and further showing the dispensing mechanism disengaged from the filter stack.
Figure 1B:
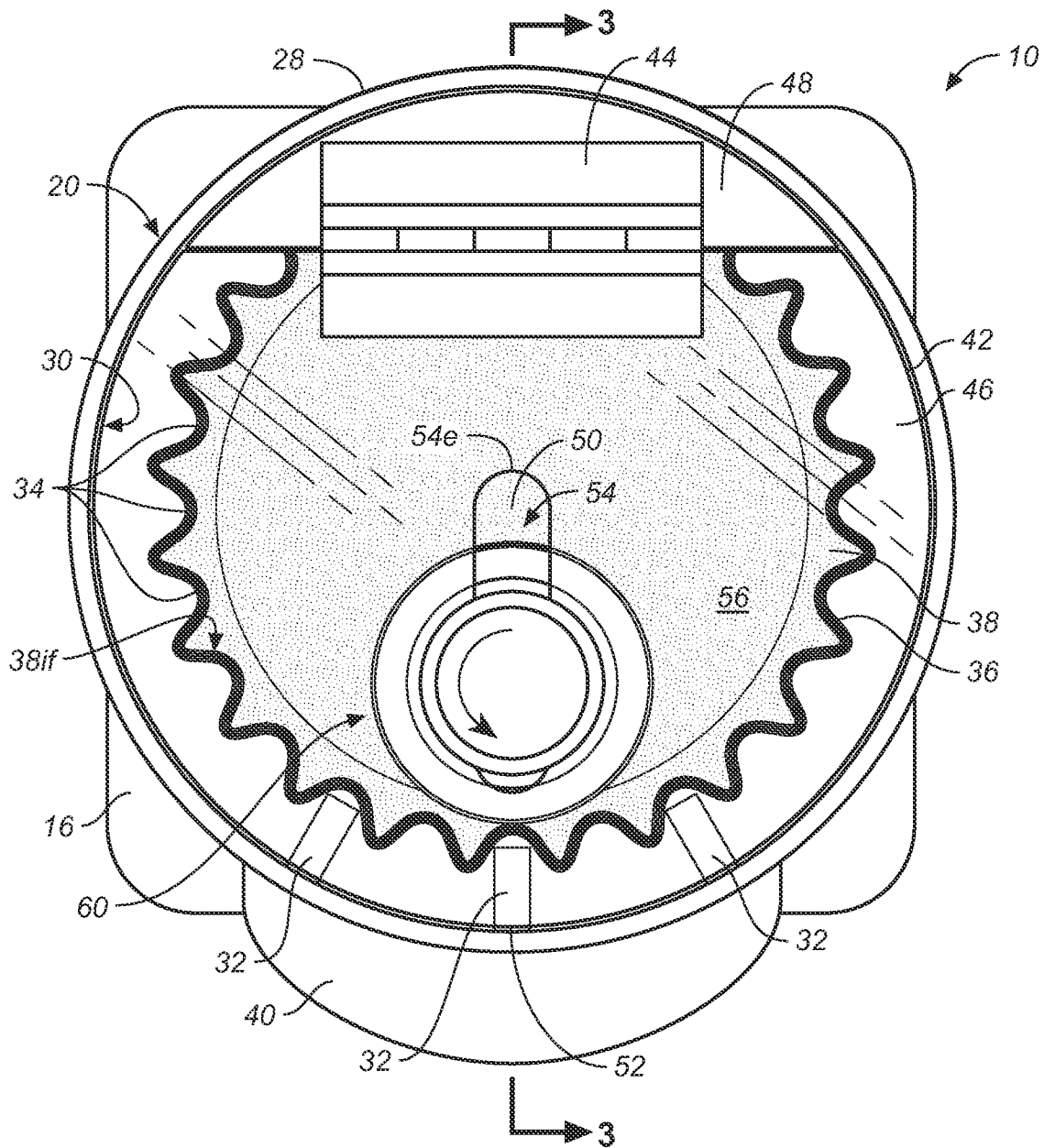
FIG. 1B is the same view showing the dispensing mechanism moved into engagement with the filter stack and the dispensing knob rotating so as to displace and separate the uppermost filter in the stack.
Figure 1C:
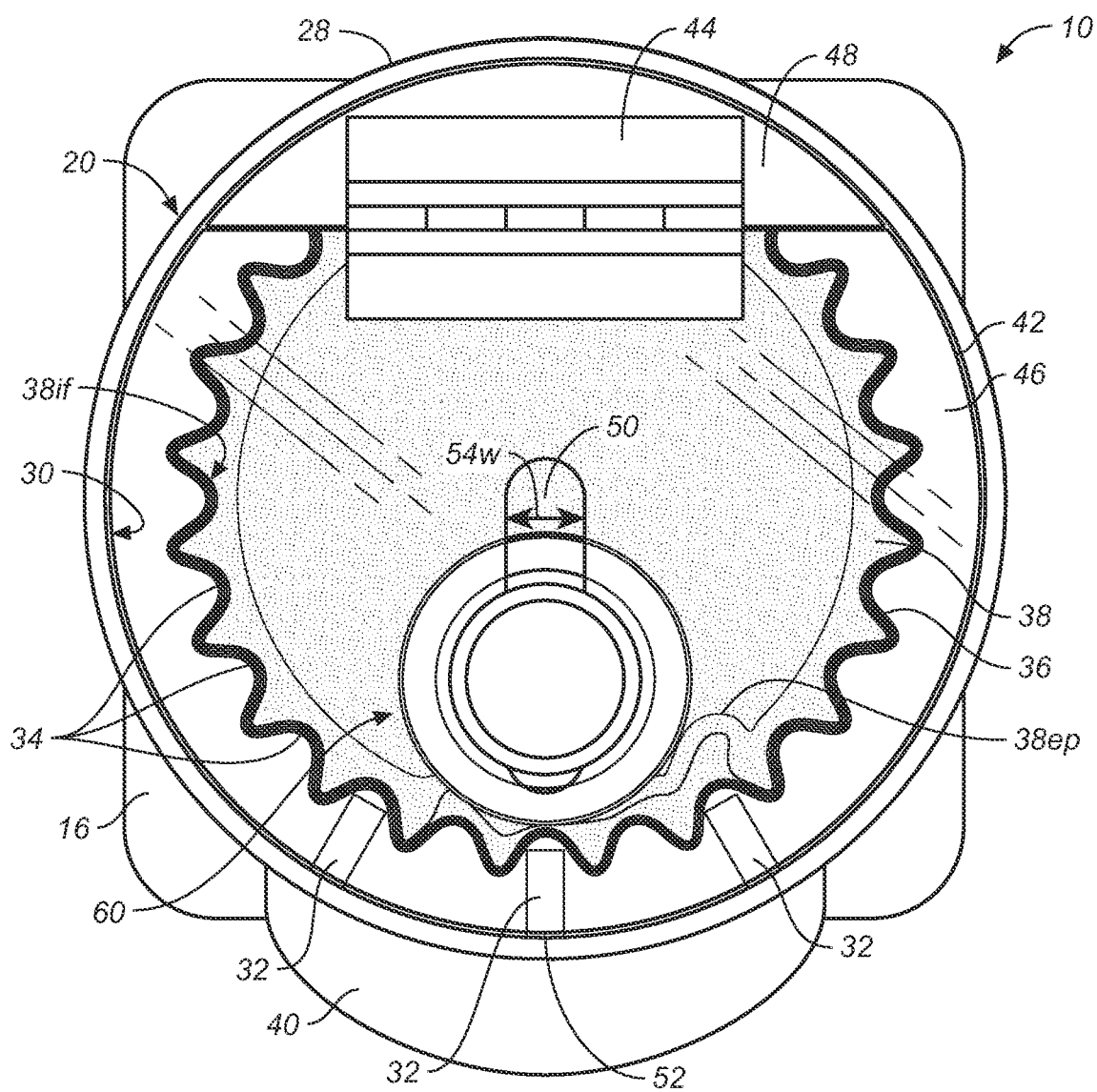
FIG. 1C is the same view showing the uppermost filter separated from the stack and configured for easy removal.
Figure 2A:
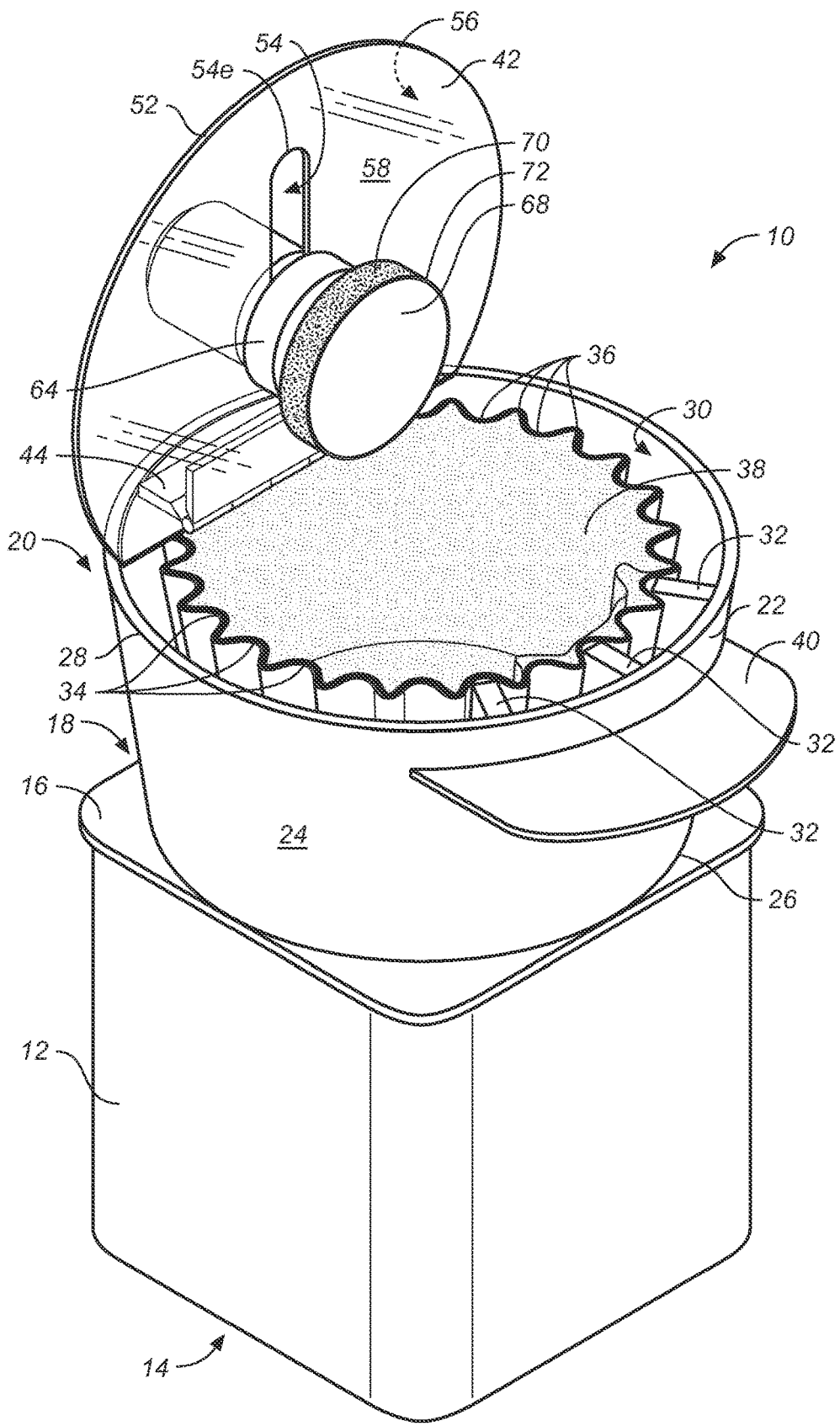
FIG. 2A is an upper left perspective view showing the container opened for removal of the separated filter.
Figure 2B:
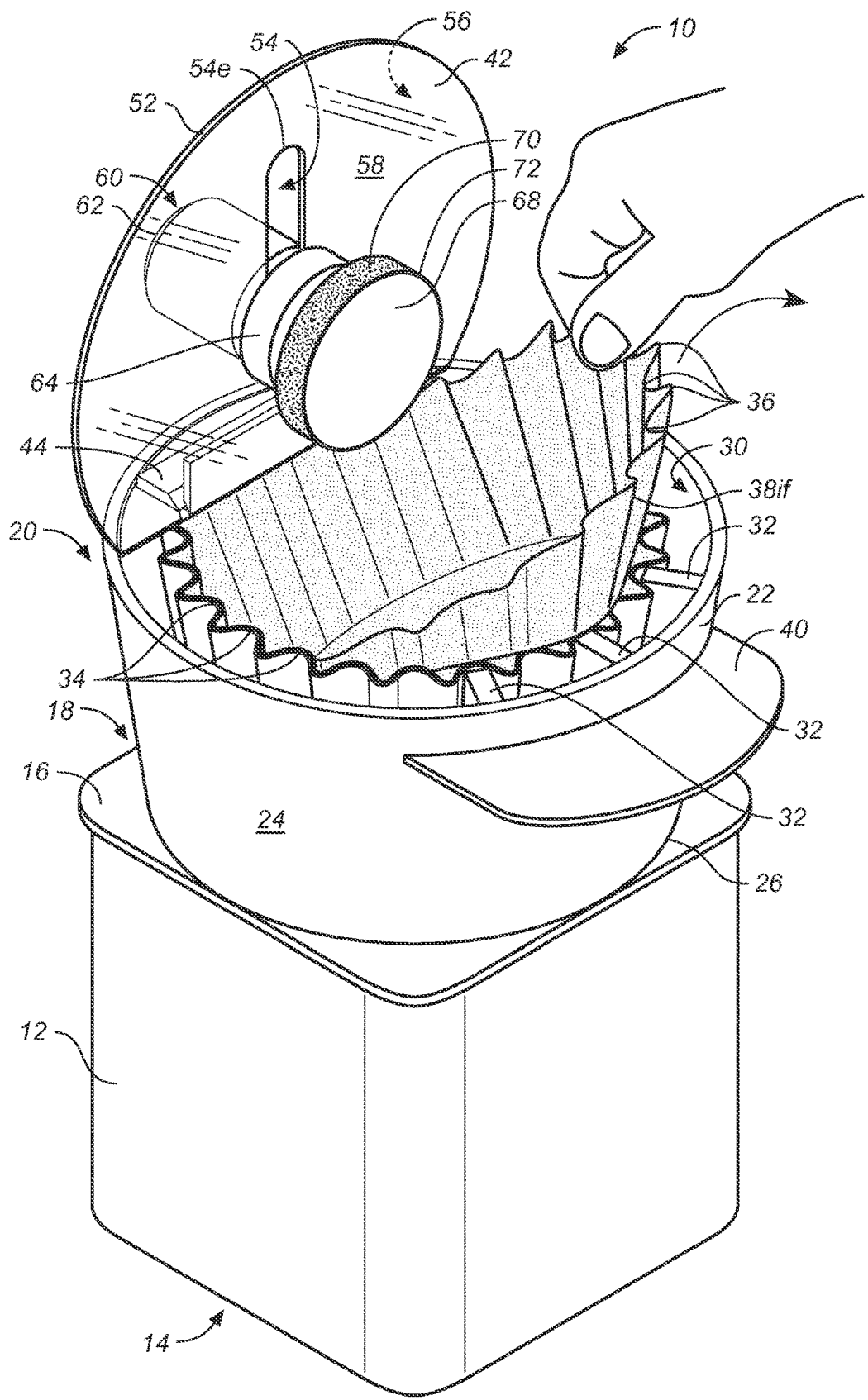
FIG. 2B is the same view showing a user removing the separated filter from the container.
Figure 3:
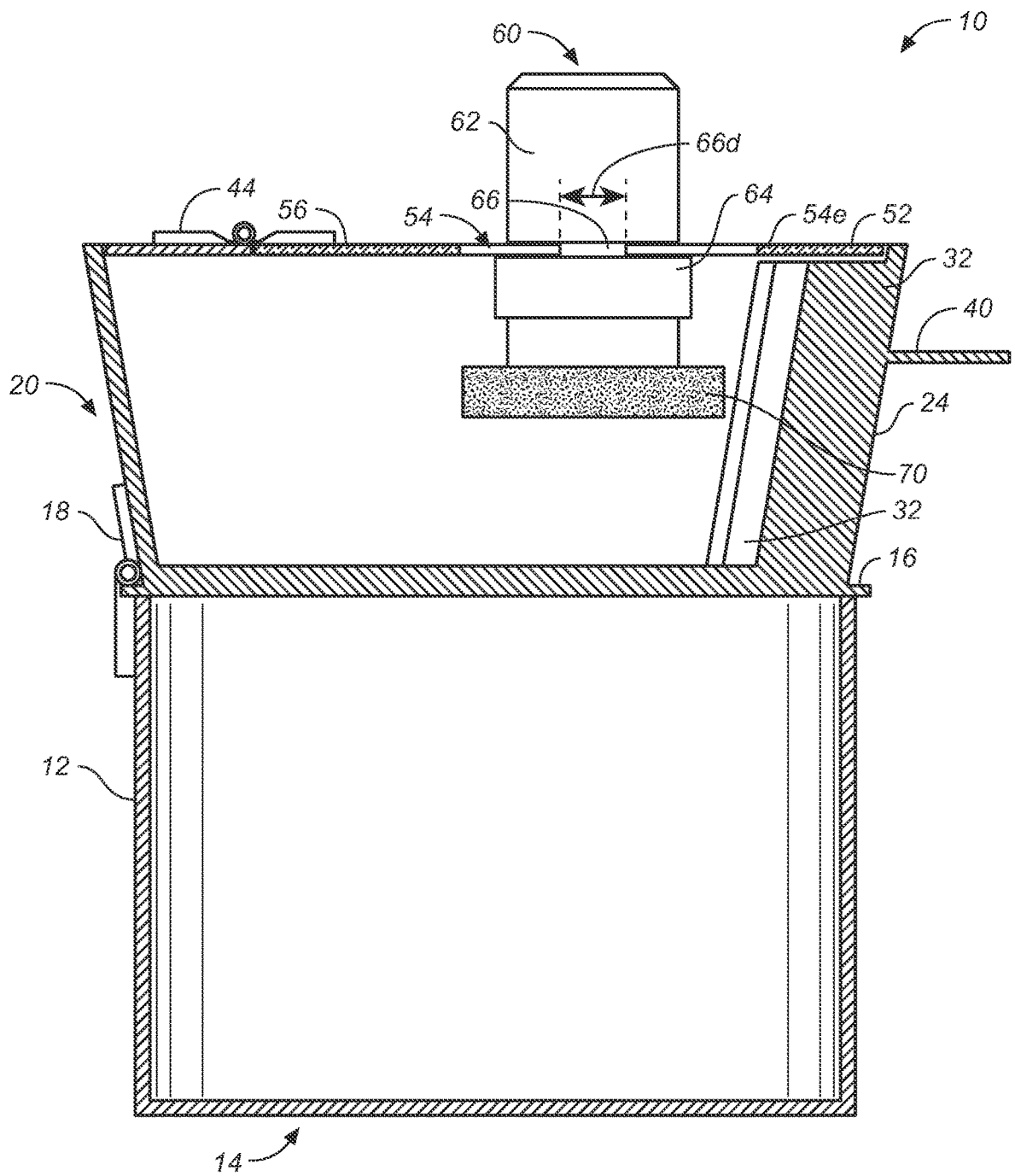
FIG. 3 is a cross-sectional side view in elevation as taken along section line 3-3 of FIG. 1B.

Referring to FIGS. 1A through 3, wherein like reference numerals refer to like components in the various views, there is illustrated therein a new and improved coffee filter container and dispenser, generally denominated 10 herein.

In embodiments, the coffee filter dispenser 10 of the present invention includes a base container 12, having a hollow interior suitable for storing coffee grounds or coffee beans or anything else suitably sized of a user's choosing. The base container has a planar bottom 14, and it is otherwise configured for stable placement on a flat surface, such as a countertop or table. That configuration can comprise any of a number of suitable shapes, though cuboid, cylindrical, and conical may be preferred to minimize angles where sides join in the interior portion. This will facilitate cleaning. The base container further includes a lid 16 coupled to the base container with a hinge 18. The size of the base container is somewhat arbitrary and has little to no bearing on function or design. However, aesthetically, it may be preferable to configure the container base and lid to complement the dimensions of the upper components of the entire assembly.

To that end, and disposed atop the lid 16, is a filter container 20, having a substantially cylindrical body portion 22 with a contiguous (single) side 24 that angles slightly outwardly from its bottom 26 to its circular upper edge 28, much like the filter basket on a coffee maker itself. The body portion is thus an inverted truncated conical section in shape—again, substantially cylindrical with an angled side.

The interior side 30 of the body portion is smooth and continuous, but it includes a plurality of vertically oriented stand-offs or bars 32, which insert into the trough portions 34 of the scalloped sides 36 of a stack 38 of paper coffee filters. So configured, when the filter stack is placed in the filter container, the stand-offs engage the filter stack to resist rotation of the filters when the dispensing mechanism (described fully below) is operated.

The filter container next includes a handle or grip 40, which may be configured as a simple tab extending substantially horizontally out from the side 24 of the body portion, though structure to facilitate easy engagement and operation may take a number of forms.

Capping the body portion is a circular and planar lid 42, sized to closely match the dimensions of the upper rim 28 of the body portion, and which may either be unitary and coupled to the upper edge of the body portion with a hinge, or in embodiments may be bifurcated at a chord and the hinge 44 disposed between the first partial circular portion 46 (defined by the major arc) and second partial circular portion 48 (defined by the minor arc).

As can be seen in the views, the lid 42 is preferably transparent (e.g., transparent polycarbonate) so that the filters 38 can be seen through the lid. Extending radially from the center 50 of the lid toward the edge 52 of the lid is a slot 54. The upper and lower surfaces of the lid, 56 and 58, respectively, are flat.

The dispensing mechanism 60 of the present invention is operatively disposed in slot 54. The dispensing mechanism includes a handle or knob 62 integral an expanded slide plate 64 slidingly disposed on the upper surface of the lid. Below, slidingly disposed on the bottom surface 58 of the lid and coupled with a rod 66 to the knob 62 and integral slide plate 64 is a dispensing wheel 68, having an annular side 70 with a high friction band 72 (e.g., soft rubber or sandpaper) circumferentially disposed around the annular side. Rod 66 has a diameter 66$d$ slightly smaller than the width 54$w$ of the slot, such that the entire assembly is slidingly disposed in the slot and moves freely from the center of the lid to the distal edge 54$e$ of the slot 54.

The slot dimensions are such that a user is able to bring the high friction band into engagement with the innermost filter 38$if$ even as the thickness of the filter stack diminishes in proportion to the reduction in the number of filters as they are dispensed. The user need only slide the knob outwardly from the center of the lid, bring the high friction band on the dispensing wheel into a light pressure engagement with the filter, and then turn the knob 62. While the interior stand-offs constrain the filter stack, this operation partially slides, deforms, and separates the innermost filter 38$if$ from its neighboring filter in the stack, so as to provide an exposed portion 38$ep$ that can be easily grasped independently to lift the filter out of the filter container. Steps in this entire operation are shown in the successive the views, FIGS. 1A through 2B, which end with removal of the filter at FIG. 2B.

The structural and operational elements of the inventive device provide a manually operated filter container and dispenser that enables a user to store and then singly remove truncated cone, scallop-sided paper basket coffee filters. The device eliminates the need for virtually any kind of moving or mechanical element that might fail in operation or break, even when used forcefully. On the other hand, operation is so smooth and effective, that minimal force is needed to dislodge and displace filters for removal.

The above disclosure is sufficient to enable one of ordinary skill in the art to practice the invention, and provides a mode of practicing the invention. While this is a full and complete disclosure of the preferred embodiments of this invention, it is does not limit the invention to the exact construction, dimensional relationships, and operations shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the claims set out herein.

What is claimed as invention is:

1. A coffee filter dispenser, comprising:
   a filter container having an inverted truncated conical shape with an open top and a generally planar bottom side, a continuous angled side defining a hollow interior volume for containing a stack of paper coffee filters with scalloped sides, and a plurality of spaced-apart vertically-oriented stand-offs projecting inwardly from said angled side and configured to insert into trough portions of the scalloped sides of the coffee filters;
   a transparent planar lid configured to be disposed atop said filter container and including a hinge to provide selective access to the interior volume of said filter container, said lid having an edge and a slot disposed in said top radially extending from near the center of said lid toward said edge; and
   a dispensing mechanism slidingly and rotatably disposed in said slot in said lid, said dispensing mechanism including a knob for gripping, a cylindrical rod disposed in said slot, and a dispensing wheel, said knob, said rod, and said dispensing wheel rotating in unison when said knob is turned by a user, said dispensing wheel having an annular outer circumference bearing a high friction material.

2. The coffee filter dispenser of claim 1, wherein when said dispensing mechanism is displaced radially outward in said slot, said friction bearing material on said dispensing wheel engages an innermost filter in a stack of filters, and said dispensing mechanism rotates while said stand-offs prevent rotation of the filter stack so as to dislodge and partially separate the innermost filter from the stack of filters to facilitate easy removal from the stack.

3. The coffee filter dispenser of claim 1, further including a base coffee container on which said filter container is disposed, said base coffee container defining a hollow interior configured to store coffee beans or coffee grounds.

4. The coffee filter dispenser of claim 3, wherein said coffee container includes a lid which functions as said bottom of said coffee filter container.

5. The coffee filter dispenser of claim 4, wherein said lid of said coffee container is connected to said base container with a hinge such that said lid may be opened to expose said hollow interior.

6. The coffee filter dispenser of claim 5, further including an integral handle on said side of said coffee filter.

7. The coffee filter dispenser of claim 6, wherein said handle is a horizontal tab.

8. The coffee filter dispenser of claim 1, wherein said transparent lid is bifurcated at a chord and said hinge joins two partial circular portions of said transparent lid.

9. The coffee filter dispenser of claim 1, wherein said exterior of said coffee filter container is cylindrical in shape.

10. The coffee filter dispenser of claim 1, wherein said exterior side of said coffee container is polygonal in shape.

11. The coffee filter dispenser of claim 1, wherein said high friction material on said annular dispensing wheel is rubber.

12. The coffee filter dispenser of claim 1, wherein said high friction material on said annular dispensing wheel is sandpaper.

13. A coffee container and coffee filter dispenser combination, comprising:
   a base coffee container having a hollow interior volume and configured for placement on a flat surface, said coffee container having a hinged lid;
   a coffee filter container disposed atop said coffee container, wherein said hinged lid is a bottom side of said coffee filter container, said coffee filter container having a hinged lid;
   a dispensing mechanism slidably and rotatably disposed in said lid of said coffee filter container, said dispensing configured to engage and separate individual coffee filters from a stack of filters contained in said coffee filter container; and
   wherein said coffee filter container includes structure to resist rotation of a stack of filters contained in said hollow interior volume when said dispensing mechanism is operated.

14. The coffee container and coffee filter dispenser combination of claim 13, wherein said coffee filter dispenser includes a high friction wheel to engage an innermost filter in a stack of filters contained in said coffee filter container.

* * * * *